United States Patent [19]

Scarzello et al.

[11] Patent Number: 5,598,152
[45] Date of Patent: Jan. 28, 1997

[54] MINE SWEEPING SYSTEM FOR MAGNETIC AND NON-MAGNETIC MINES

[75] Inventors: John F. Scarzello, Columbia; Peter B. Keller, Takoma Park; Richard W. Harrison, Bethesda, all of Md.

[73] Assignee: The United States of America as represented by the Secretary of the Navy, Washington, D.C.

[21] Appl. No.: 368,268

[22] Filed: Dec. 29, 1994

[51] Int. Cl.$^6$ .......................... H04B 13/02; G01S 17/00; B63G 7/06
[52] U.S. Cl. .................... 340/850; 102/402; 342/22
[58] Field of Search ................... 340/850, 852; 102/401, 402; 342/22; 343/719; 89/1.13; 114/221 A, 240

[56] References Cited

U.S. PATENT DOCUMENTS

| | | | |
|---|---|---|---|
| 3,707,913 | 1/1973 | Lee | 102/18 |
| 3,719,947 | 3/1973 | Gutton et al. | 343/112 R |
| 3,903,520 | 9/1975 | Shostak | 343/5 PD |
| 3,946,696 | 3/1976 | Lubnow | 114/221 R |
| 4,072,941 | 2/1978 | Hamid et al. | 343/5 NA |
| 4,303,108 | 5/1981 | Eknayan | 340/850 |
| 4,562,789 | 1/1986 | Bornhofft et al. | 114/312 |
| 4,582,582 | 4/1986 | Gibbard | 204/193 |
| 4,627,891 | 12/1986 | Gibbard | 204/1 R |
| 4,721,961 | 1/1988 | Busignies et al. | 342/458 |
| 4,938,136 | 7/1990 | Gould | 102/406 |
| 4,970,701 | 11/1990 | Kirkland | 367/131 |
| 4,970,702 | 11/1990 | Kirkland | 367/131 |
| 4,992,786 | 2/1991 | Kirkland | 340/850 |
| 5,001,485 | 3/1991 | Jones | 342/13 |
| 5,007,346 | 4/1991 | Kirkland | 102/402 |
| 5,019,822 | 5/1991 | Kirkland | 342/22 |
| 5,063,850 | 11/1991 | Olsson et al. | 102/402 |
| 5,153,595 | 10/1992 | Harmuth | 342/22 |
| 5,159,343 | 10/1992 | Harmuth | 342/22 |
| 5,206,640 | 4/1993 | Hirvonen et al. | 340/852 |

*Primary Examiner*—Ian J. Lobo
*Attorney, Agent, or Firm*—Jacob Schuster

[57] ABSTRACT

A mine sweeping system including deployable horizontal antennas to establish a detection and navigation grid extending underwater from a beach to a distance offshore. A computer-controlled transmitter unit having a waveform generator and amplifier, transmits signals to each antenna, at unique frequencies and phases for different spatial locations within the grid. An autonomous underwater vehicle having multi-integrated sensors detects anomalies in the electromagnetic field caused by both magnetic and non-magnetic objects therein during underwater travel utilizing the electromagnetic field as a navigational grid. The autonomous underwater vehicle also deposits mine-clearing explosives at each magnetic anomaly for detonation under command signal using the horizontal antennas which provide a means for establishing a navigation grid to permit landing craft and other vessels to navigate in the region cleared of mines.

10 Claims, 10 Drawing Sheets

MINE SWEEPING SYSTEM FOR MAGNETIC AND NON-MAGNETIC MINES

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The present invention relates generally to the detection of underwater objects and more particularly to mine sweeping systems using low-frequency electromagnetic fields.

BACKGROUND OF THE INVENTION

Methods for detecting submerged objects such as mines may be categorized as either passive or active systems. Passive systems emit no energy, but instead sense disturbances in the underwater environment created by the presence of a submerged object. Active systems, on the other hand, rely on the sensing of emitted energy either reflected or radiated by the object to be detected. One example of the latter type of system is a conventional sonar device wherein a directional beam of acoustic energy periodically radiates from a scanning transducer which in turn may operate as a receiver to detect echoes reflected from an object within the path of propagation. Although satisfactory for many uses, sonar devices have several inherent limitations. Nearby objects can cause echoes and these may obscure the echo of the object to be detected. A rocky bottom will produce many echoes, thus making efficient detections of objects on the bottom almost impossible. In addition, objects whose specific acoustic impedance is similar to that of water will produce only a small echo or no echo at all if their specific acoustic impedance is the same as that of water.

Another type of active system includes systems which set up electric or magnetic fields and measure variations therein. Magnetic objects will cause a variation in the magnetic field due to their being magnetized by the applied magnetic field while non-metallic objects immersed in sea water will cause a variation in the electromagnetic field by creating a "hole" in the conductivity pattern of the sea water.

In general, the variations in the applied electromagnetic field created by these objects is small and it has, in the past, been difficult to find sensors that could detect these perturbations. Once found, an object must be identified so that one can tell whether it is a hostile threat. Additionally, there may be hundreds of mines within a given region such as a mined surf zone which must be neutralized. Then, after finding a mine either floating, proud or buried, its effectiveness must be destroyed, either by removal or by destruction.

Accordingly, it is an object of the present invention to detect and identify both metallic and non-metallic underwater objects.

It is also an object of the invention to detect and identify bottom, proud and buried mines.

A further object of the invention is to determine the location of underwater objects such as mines with respect to an electromagnetic grid.

Another object of the invention is to provide a navigational grid which can be used by landing craft and other kinds of boats and vessels.

Yet another object of the invention is to generate an electromagnetic field having a navigational grid therein.

It is yet another object to provide a detonating device and means for detonating mines by command signal or at a specific time so as to provide a single detonation event for all mines within a specific channel.

SUMMARY OF THE INVENTION

The present invention attains the foregoing and additional objects by providing an underwater object detection and identification system which comprises a transmitting unit, a receiving unit, and cables deployed near the area to be cleared of mines. The transmitting unit is connected to horizontal antennas. These antennas are deployable underwater as lengths of insulated cable near and/or in the region to be cleared of mines. In general, cables will be laid parallel to each other and another cable deployed crossways to set up an orthogonal grid. The transmitter provides a unique signal to each cable to set up a unique electromagnetic field in the region to be cleared of mines. Additional cable signals allow a hyperbolic system of navigation to be established so that every location in the region to be cleared has a unique address. A small autonomous underwater vehicle (AUV) having a receiving and transmitting unit is deployed in the water and senses the field generated by the cables. The receiving unit comprises a receiving antenna, a pre-amplifier, and sufficient electronics to allow any object causing a perturbation of the magnetic or electric fields to be identified and recorded. The AUV navigates throughout the region mapping field anomalies and recording their addresses within the navigation grid. Upon locating an anomaly with pre-determined signal characteristics, the AUV may deposit a detonating charge and/or signaling device at the location and, using its transmitter, may report the anomaly and its address to a computer at the transmitting unit. Detonation of the charges would occur at a pre-set time or by command signal from the computer through the antennas. Whether by timing or command, a simultaneous detonation of all mines in the channel occurs. The simultaneous detonation is important so that mines which were undetected will be detonated by the shock wave of the explosion.

BRIEF DESCRIPTION OF THE DRAWINGS

The foregoing objects and other advantages of the present invention will be more fully understood from the following detailed description and reference to the appended drawings wherein.

DETAILED DESCRIPTION OF PREFERRED EMBODIMENTS

Figure 1:
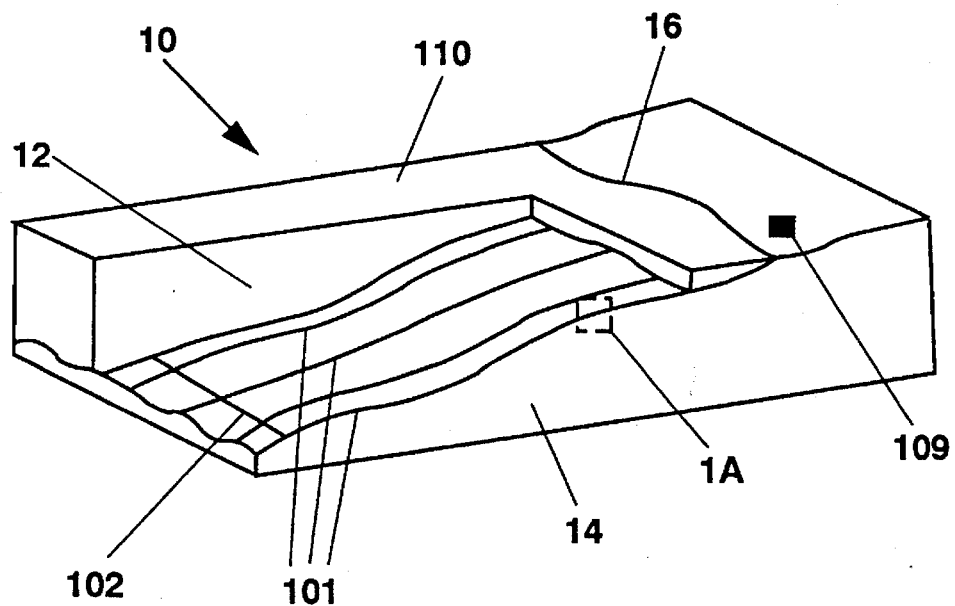
FIG. 1 is a perspective representation of a deployed mine sweeping system.
Figure 1A:
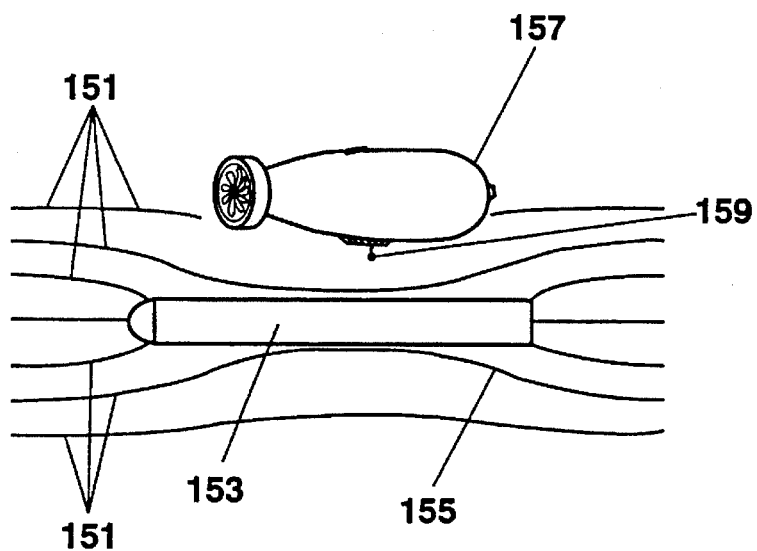
FIG. 1A is an enlarged partial perspective view of a detection region serviced by the system depicted in FIG. 1, showing the detailed elements thereof.

Referring now to FIG. 1, the overall system of the invention, designated generally by the reference numeral 10, is shown with its major components within a body of seawater 12 overlying a seabed 14 extending therefrom beyond coastline 16 to deep water. The system 10 comprises a series of parallel deployable horizontal electric dipole (HED) antennas 101 and an orthogonal HED antenna 102. The HED antennas may be deployed by expendable aerial rockets or by expendable mini-torpedos as hereinafter described. The HED antennas are operated and controlled by a transmitter unit 109 located on land adjacent to the coastline or in the water. After deployment and power up of the antennas, an autonomous underwater vehicle (AUV) 157, as shown in FIG. 1A, is launched so as to navigate throughout the entire electromagnetic field generated by the deployed antennas. The region 1A within the seabed 14 as shown in FIG. 1, is shown in detail in FIG. 1A as having a buried mine 153. FIG. 1A also shows the electromagnetic illuminating source field 151, represented by parallel lines, interacting with the buried mine 153 producing a perturbed electromagnetic field 155, where the parallel lines are curved. An electromagnetic or acoustic marker 159 and/or a detonating device may be deposited at the location of the anomaly by the AUV 157.

Figure 2:
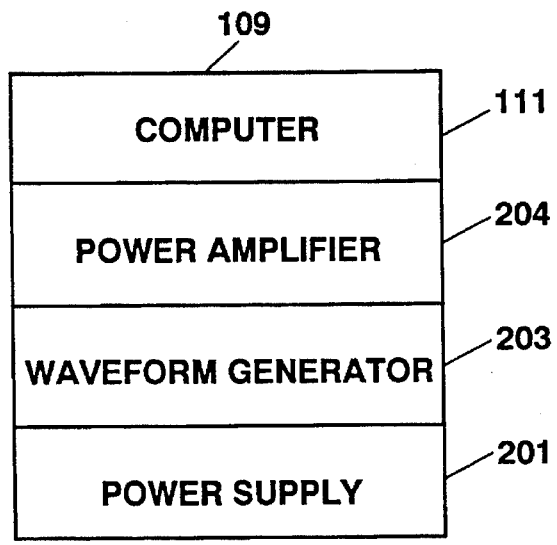
FIG. 2 is a block diagram of a transmitting unit and computer controller associated with the mine sweeping system.

The transmitter unit 109 as diagrammed in FIG. 2, to which the antennas 101 and 102 are connected, comprises a power supply 201, waveform generator 203 and power amplifier 204, all controlled and operated by computer 111. The waveform generator 203 produces stable waveforms with unique frequencies and phase characteristics for each one of the antennas 101 and 102.

Figure 3:
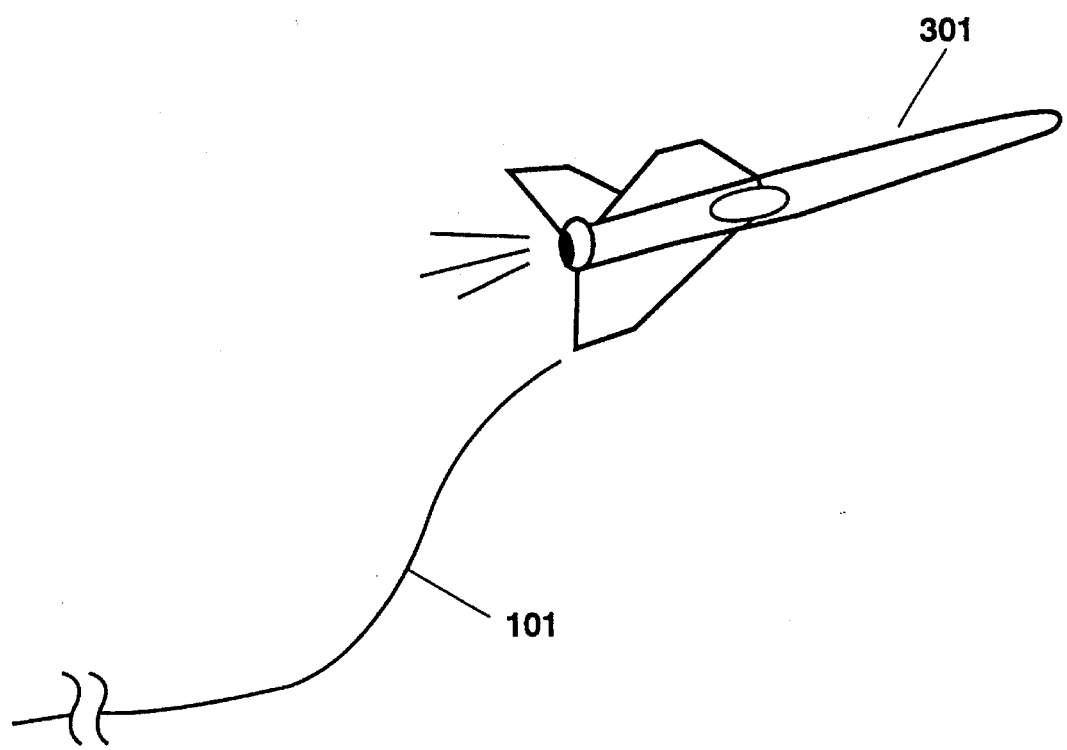
FIG. 3 is a perspective view of an aerial rocket for deployment of antenna cables utilized in the system depicted in FIG. 1.

FIG. 3 depicts an expendable aerial rocket 301 for deploying each of the HED antennas 101 from deep water to the beach adjacent to coastline 16. In one preferred embodiment, approximately two thousand feet of cable is deployed for each antenna wire. The antenna array consists of a set of parallel cables of insulated copper wire, carrying approximately 10 amperes of current. The cables are placed at either edge and, if necessary, through the center of the area to be cleared of mines. Alternating current flowing through such cables generates a low frequency electromagnetic field which polarizes any metallic mines such as an AMD series mine. Once such a mine is polarized, it acts as a radiating dipole and re-transmits some of the incident electromagnetic energy. This re-radiated energy has a different phase and amplitude as compared to the original transmitted energy and thus alters the electromagnetic field in the vicinity of the mine.

In the case of a non-metallic mine such as a Manta, there will be a "hole" the size of the mine created in the conducting media of seawater. A separation of charge around the boundaries of the "hole" occurs due to the applied electromagnetic field. This charge separation now acts as a radiating dipole altering the external field in the vicinity of the mine. Thus in both cases, with either magnetic or non-magnetic mines, the applied field is sufficiently changed near the mine to permit detection. More importantly, the exact nature of field deformations resulting from some object therein, allows it to be classified as a hostile threat or inert object. The field strength differences so produced are detected by the autonomous underwater vehicle (AUV) 157 which, after object detection, will submit the suspected object to further classification tests. If a mine is identified, either an underwater explosive to be activated when detection sweeping is completed, or an active marker will be deposited by the vehicle 157 at the mine site. Operations can begin at any location away from the beach and a search pattern established to clear a channel of any width to the beach.

Figure 4:
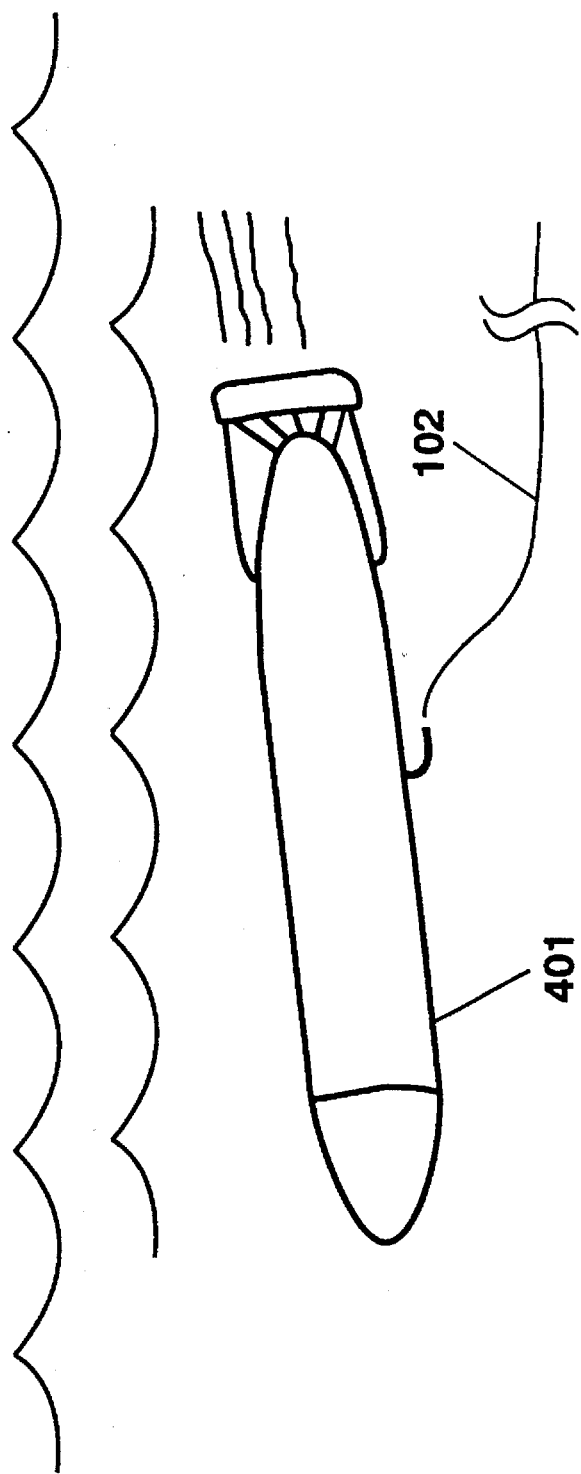
FIG. 4 is a perspective view of a mine-torpedo alternatively used in deploying the antenna cables.

According to another embodiment, antenna deployment is effected as shown in FIG. 4 by an expendable mini-torpedo 401. The mini-torpedo 401 can deploy both the beachward antennas 101 and the orthogonal antenna 102. Likewise, the aerial rockets 301 can deploy all antennas.

Figure 5:
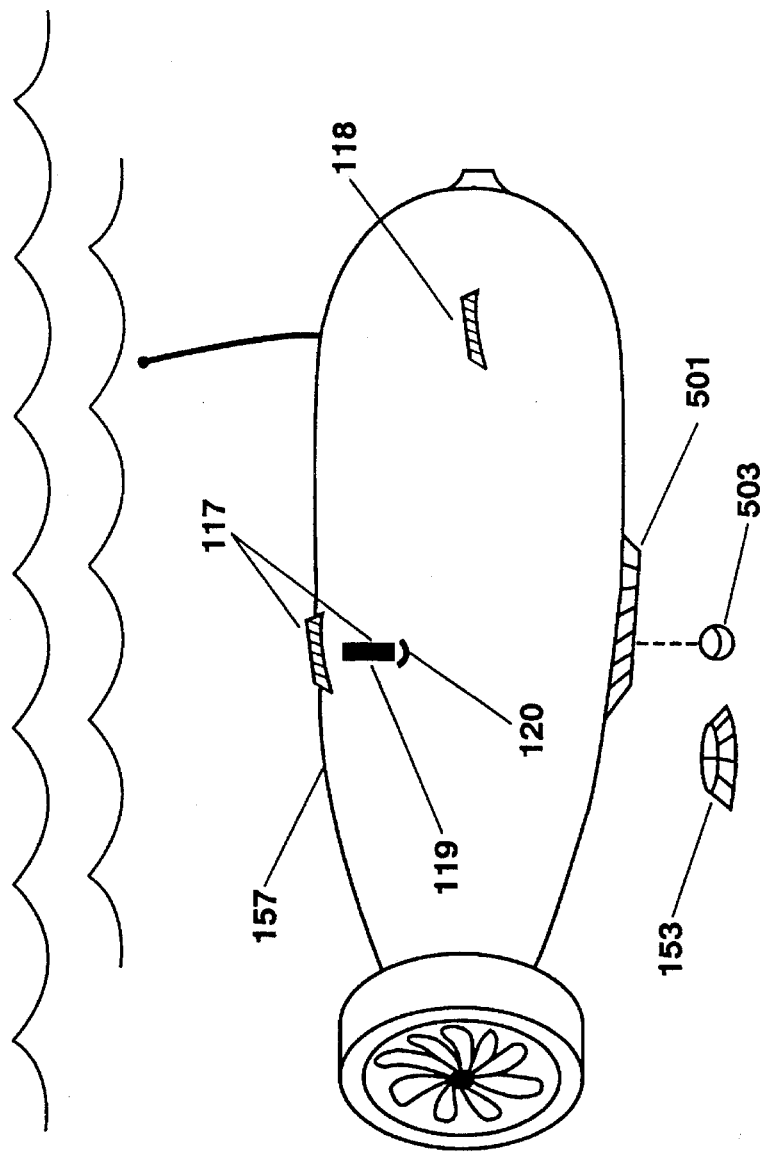
FIG. 5 is a perspective view of an autonomous underwater vehicle associated with the system depicted in FIG. 1.

Referring now to FIG. 5, the autonomous underwater vehicle 157 is shown with its major components. The AUV is a self-powered, self-navigating device which navigates by sensing the electromagnetic field generated by the antennas using an electromagnetic field sensor array 118. The receiving antennas on the AUV 157 include an integrated multi-mode passive magnetic gradiometer 119, electromagnetic scattering sensor array 117, and an inductive mine locator sensor 120. These sensors are used to locate conductivity anomalies and identify mines. Additionally, the AUV has a weapons carriage and release mechanism 501 for deploying detonating weapons and/or marker devices 503 near the mine 153.

Figure 6:
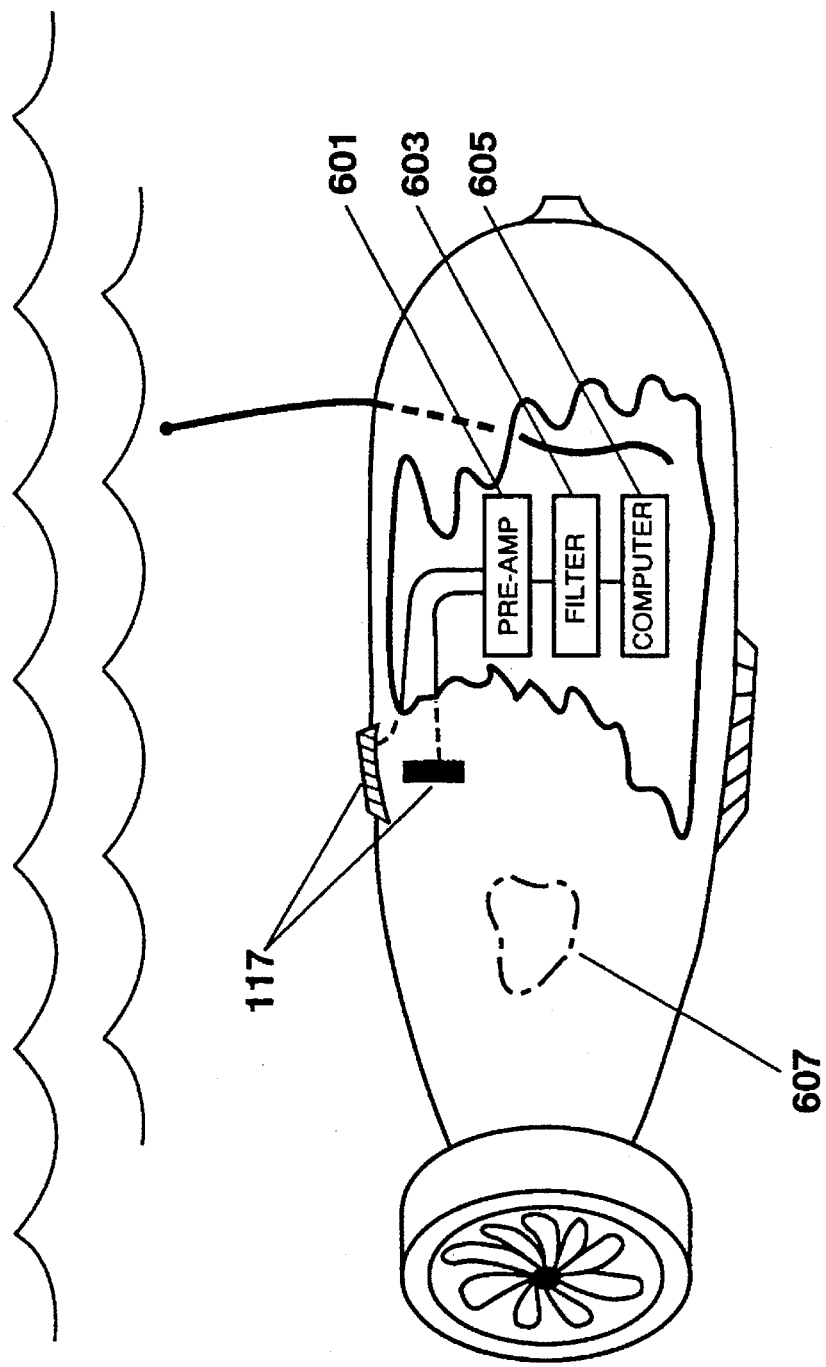
FIG. 6 is a perspective view of the autonomous underwater vehicle illustrated in FIG. 5, with a portion thereof cutaway to show components of a receiver assembly therein.

Referring to FIG. 6, a cutaway view of the AUV diagrams the components of the AUV receiver unit. The receiver unit comprises the receiving antennas 117, which receives the signal from the antennas. The received signal is amplified in pre-amplifier 601, examined and classified by the data processor 603 which is controlled by computer 605. The address and identification of each anomaly may be stored in the computer 605. Also located in the AUV is a space 607 reserved for a collection of markers and/or receiver/detonators to be released near the site of an electromagnetic anomaly identified as a mine.

Figure 7:
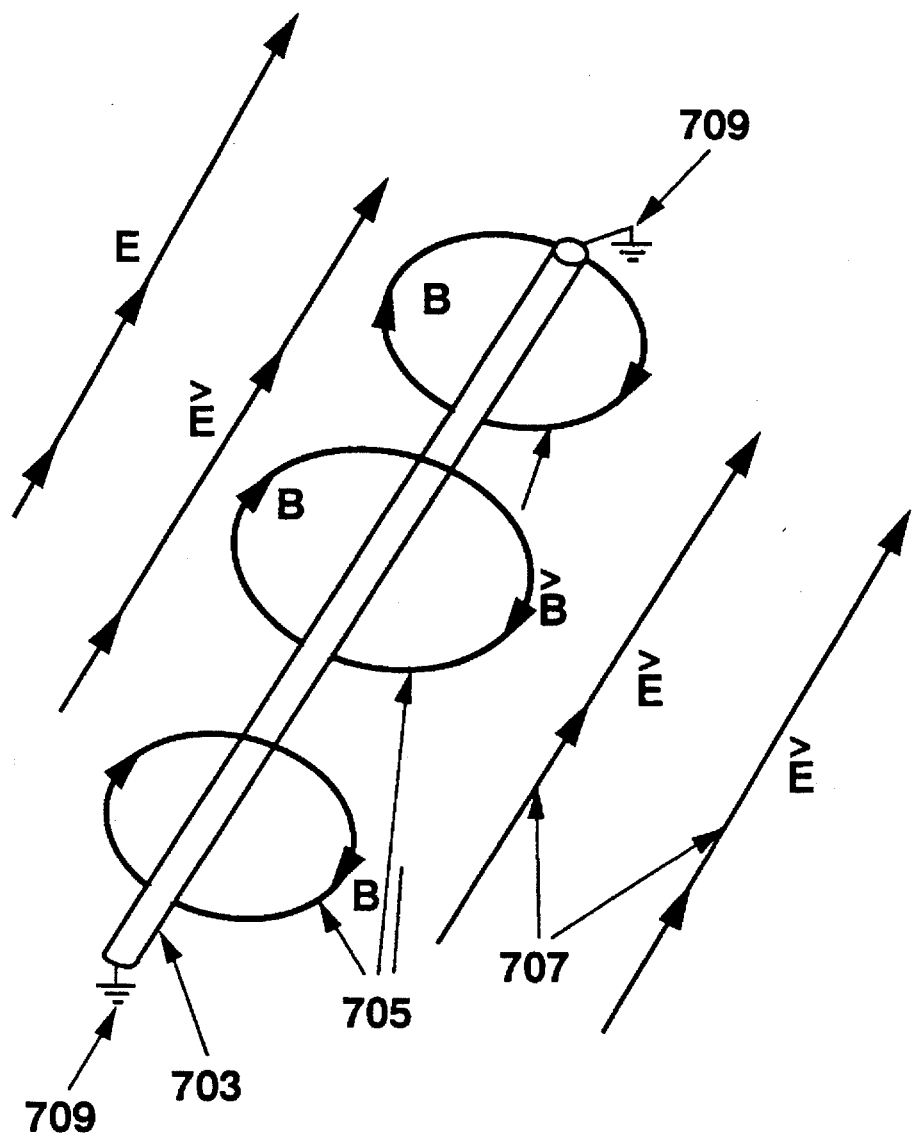
FIG. 7 depicts a single horizontal electric dipole antenna corresponding to an elongated version of the antenna showing the electric and magnetic fields associated therewith.

For a frequency of 15 Hz, in which the wavelength of the current in an antenna cable is very much larger than the cable length, and wherein the suspected mine is located at a distance much shorter than the cable length, the cable assumes the characteristics of a long line source corresponding to that of an antenna 703 as shown in FIG. 7. For such a source, the direction of the magnetic field 705 due to the current in the cable is always perpendicular to the antenna 703 and the lines of force 707 of the electrical field are parallel to the antenna and parallel to each other. The un-insulated ends of the antenna serve as a ground depicted by ground symbol 709.

The electromagnetic field in sea water becomes much more complex as the properties of the bottom are taken into account, since additional reflections and refractions occur depending on the conductivity of the bottom. The electromagnetic field is increased due to reflections from the sea bottom and the increase may be several orders of magnitude. In addition, shallow water causes strong reflections from the water surface and these reflections contribute to the field everywhere in the water.

Figure 8:
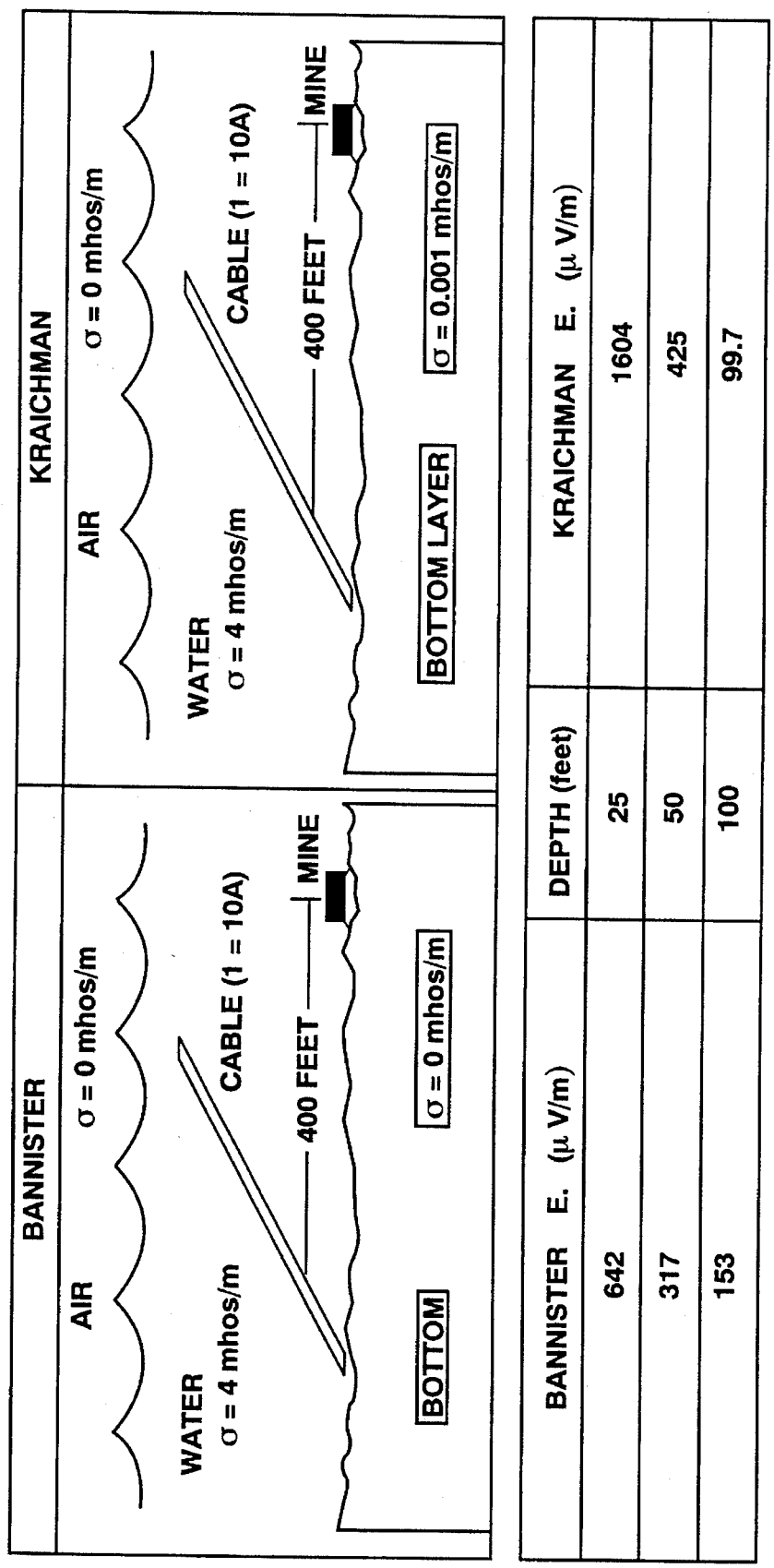
FIG. 8 is a comparative representation of two known electric field models of the antennas.
Figure 9:
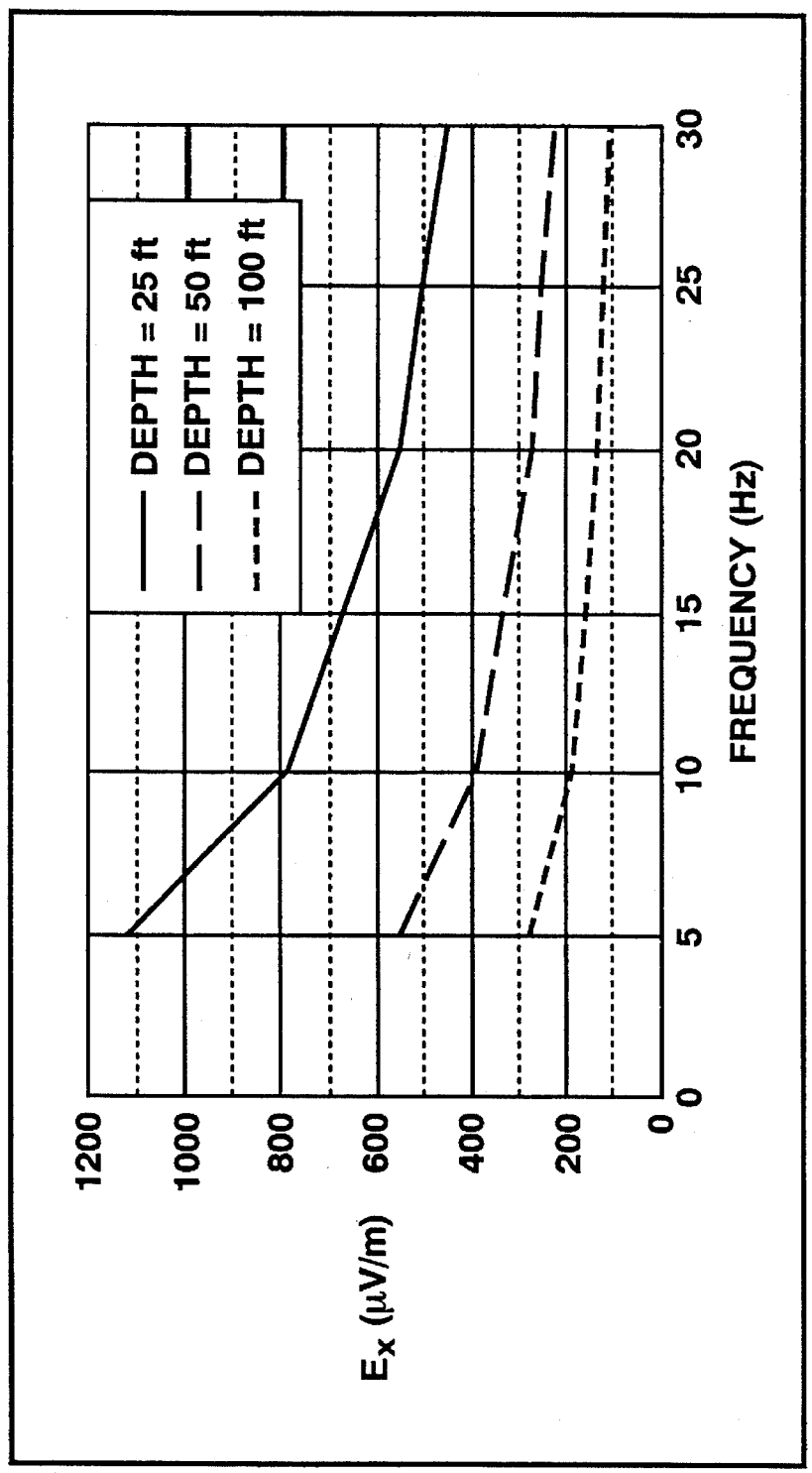
FIG. 9 is a graphical representation of the electric field values at selected water depths using a known model.
Figure 10:
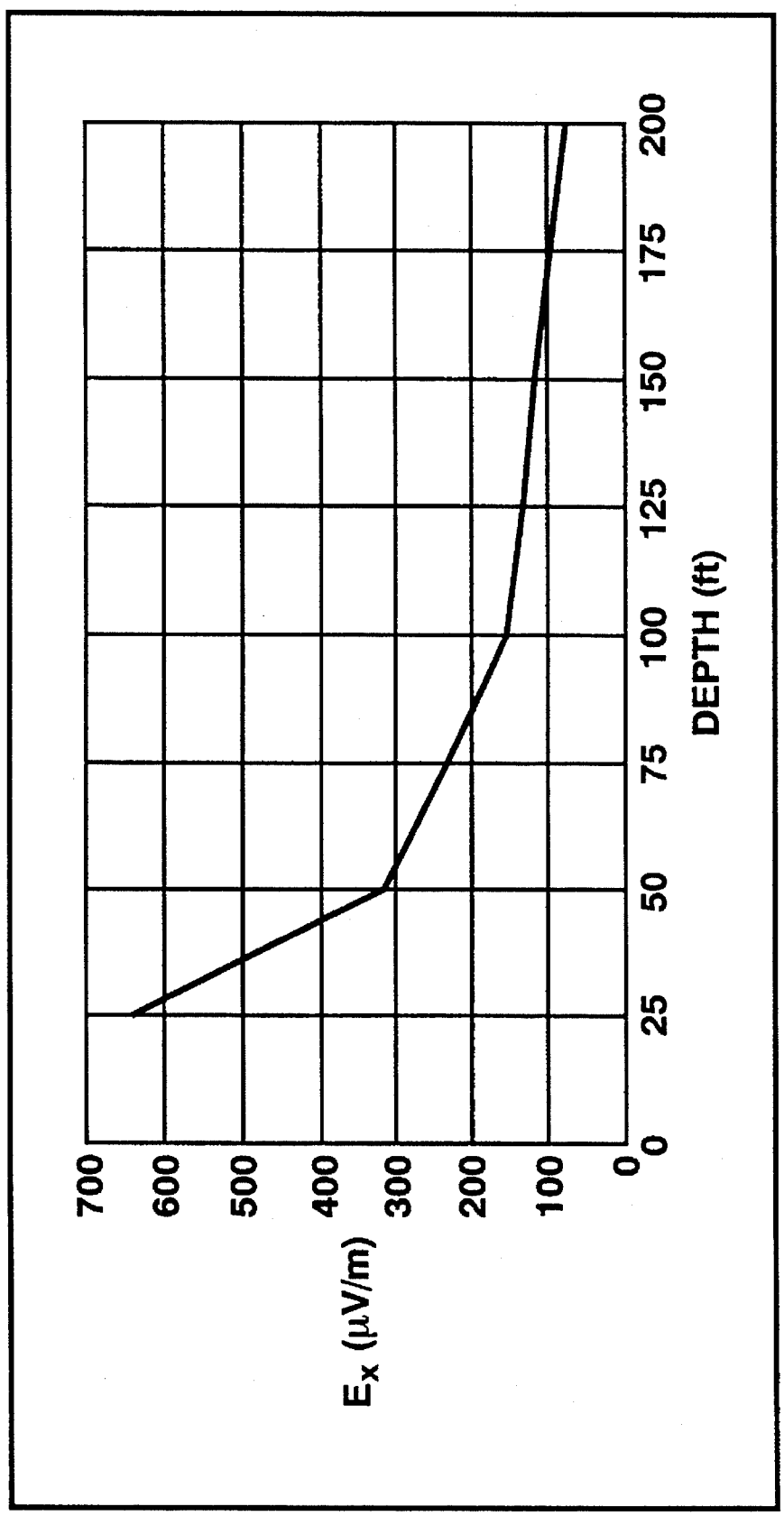
FIG. 10 is a graphical representation of the electric field values at selected water depths using a known model as an alternative.

It is known in the art that image theory yields a solution for the electromagnetic field for a long line source located at the water surface with an observation point also located on the surface. Correction factors for a layered conducting layer solution using the seawater as one layer and the ocean bed as another permit the field on the bottom, due to a long line source on the surface, to be computed. In this regard, the Handbook of Electromagnetic Propagation in Conducting Media, by M. B. Kraichman, is referred to. The content of such document is incorporated herein by reference. Additionally, other known techniques for solving electromagnetic field equations are available using models developed by P. R. Bannister may be used to corroborate those models used by Kraichman, as set forth in "The Quasi-Static Range Propagation Equations for the Approximate Fields within a Conducting Slab", NUSC Technical Report 5807, Naval Underwater Systems Center, New London, Conn., Oct. 2, 1978, which is also incorporated herein by reference. Using both of the foregoing documents the electric field at a distance of 400 feet from a 2000 foot cable carrying ten amperes was calculated for depths of 25, 50, and 100 feet and for various frequencies. The results appear in FIGS. 8, 9 and 10 and include the additional fields due to reflection from the water surface and sea bottom. Note in FIG. 8 that the field for a depth of 25 feet is at least four times that for a depth of 100 feet. FIG. 9 shows the effect of depth on the intensity of the E field and FIG. 10 shows the effect of frequency. All of the calculations shown were performed on a "worst case" basis, wherein most of the mines will be located much closer to the cables than 400 feet and thus will experience a much larger external electric field since the field variation is proportional to the inverse cube of the distance.

In accordance with one aspect of the invention, after the antennas 101 and 102 have been deployed, the waveform generator 203 of the transmitter unit 109 generates a set of highly stable electrical signals at predetermined frequencies. The power amplifier 204 amplifies these electrical signals and then transmits them to the HED antennas 101 and 102, which are located in the seawater 110. The antennas then radiate electromagnetic signals through the seawater 110. The receiving antenna unit 117 located on AUV 157 detects the radiated electromagnetic signal and sends it to the preamplifier 601. The preamplifier 601 increases the strength of the received electrical signal before sending it to the processor 603.

When the transmitted electromagnetic signal encounters a submerged object in the seawater, the electromagnetic field in the vicinity of the submerged object is modified. The signal processing technique of the system accordingly uses a differential spectral analysis to examine continually the amplitude of various frequency components. Abnormal changes in the electromagnetic field beyond those which would be suspected due to a change in the location of the AUV are highly suspect and indicative of the existence of a foreign body. The computer, acting in conjunction with the processor is able to identify these objects. A hyperbolic system of navigation based on the signals emanating from the antennas is used to determine the position of any suspected object. Finally, landing craft may use the hyperbolic system of navigation set up by the HED antennas and the transmitter unit 109 to safely navigate in the area cleared of mines.

Figure 11:
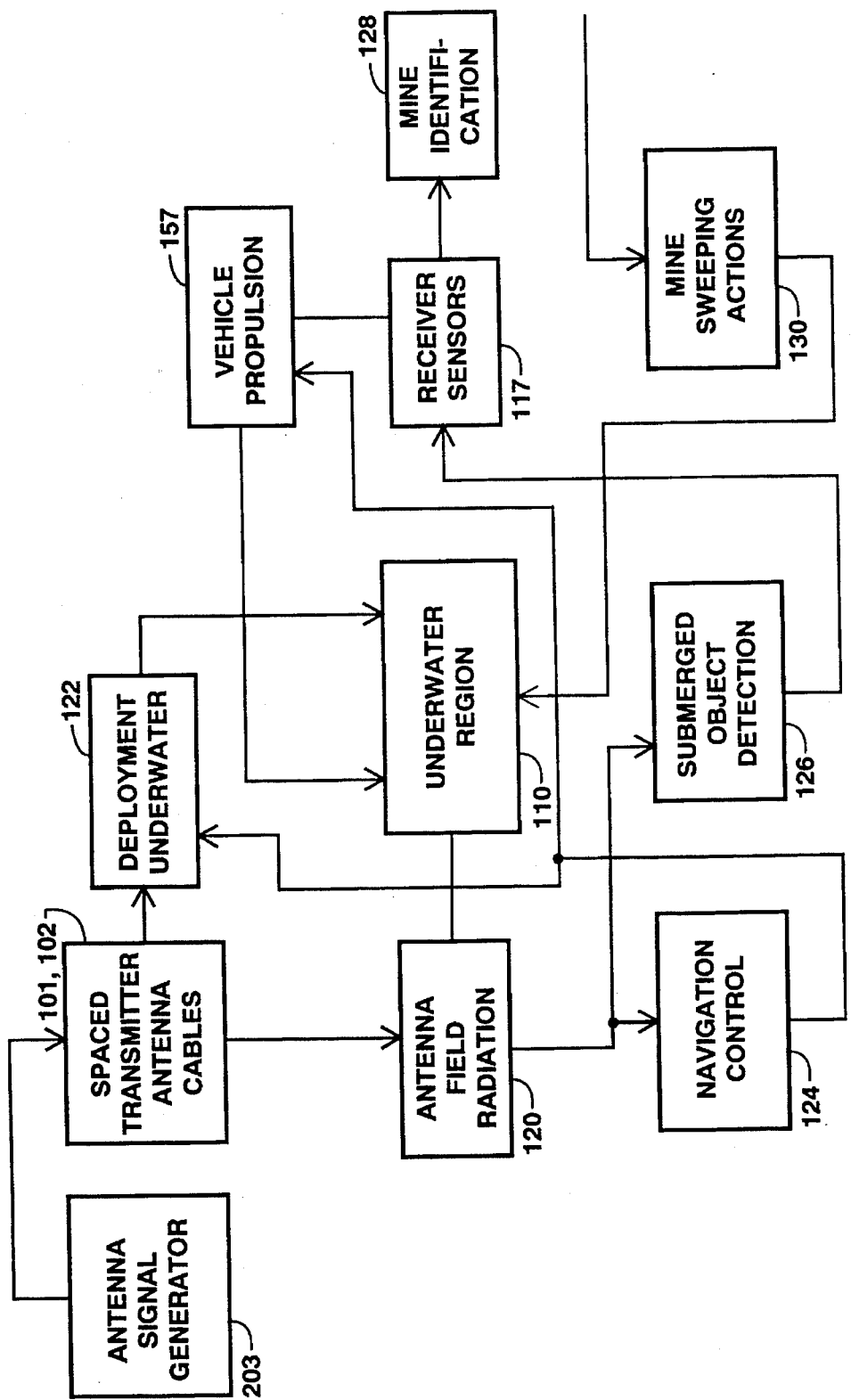
FIG. 11 is a block diagram of the procedure of the system depicted in FIG. 1.

FIG. 11 diagrammatically summarizes the procedure underlying operation of the mine sweeping system 10 as hereinbefore described utilizing a grid of spaced antenna cables 101 and 102 receiving inputs from the antenna signal generator 203 to effect field radiation, as denoted by block 120, within underwater region 110 into which the grid of cables 101 and 102 has been deployed either by aerial rockets 301 or underwater torpedo 401 as denoted by block 122. The antenna field radiation performs navigation control and submerged object detection as respectively denoted by blocks 124 and 126. The navigation control 124 is operative to effect directional control over propulsion of vehicle 157 carrying an array of sensors 117 through the underwater region 110 as diagrammed in FIG. 11. The submerged object detection function 126 of the antenna field radiation 120 is applied to the underwater vehicle sensor 117 to produce a mine identification readout 128 as well as mine sweeping actions 130 within region 110 based on mine location data obtained from readout 128.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of Patent of the United States is:

1. A mine sweeping system having antenna cables from which electromagnetic radiation is emitted and receiver means for detection of emitted electromagnetic radiation, a method comprising the steps of: deploying said antenna cables in spaced relation to each other within an underwater region to establish therein an electromagnetic a radiation field modified by objects to be detected; controlling signal input to said antenna cables for establishing a navigational grid within the electromagnetic radiation field throughout the underwater region; transporting said receiver means through the underwater region under control of said navigational grid; and signal processing data output from the receiver means during said transporting thereof for identification and location of said objects to be detected within the underwater region.

2. The mine sweeping system as defined in claim 1 wherein said objects to be detected are magnetic and nonmagnetic mines.

3. The mine sweeping system as defined in claim 2 wherein said step of deploying the antenna cables is performed by aerial rockets.

4. The mine sweeping system as defined in claim 2 wherein said step of deploying the antenna cable is performed by expendable mini-torpedoes.

5. The mine sweeping system as defined in claim 2 wherein the signal input to said antenna cables are stable signals generated at predetermined frequencies respectively supplied to the antenna cables.

6. The mine sweeping system as defined in claim 5 wherein said step of transporting the receiver means comprises: propulsion thereof by means of an autonomous underwater vehicle.

7. The mine sweeping system as defined in claim 6 wherein said step of signal processing the data output comprises: spectral analysis by continuous measurement of amplitude differences between different frequency components of the data output from the receiver means.

8. The mine sweeping system as defined in claim 1 wherein the signal input to said antenna cables are stable signals generated at predetermined frequencies respectively supplied to the antenna cables acting as horizontal electric dipoles.

9. The mine sweeping system as defined in claim 1 wherein said step of signal processing the data output comprises: spectral analysis by continuous measurement of amplitude differences between different frequency components of the data output from the receiver means.

10. In a system having antenna cables from which electromagnetic radiation is emitted and receiver means for detection of said electromagnetic emitted radiation, a method comprising the steps of: deploying said antenna cables in spaced relation to each other within an underwater region to establish therein an electromagnetic radiation field modified by objects to be detected; generating stable signals at predetermined frequencies respectively supplied to the antenna cable for establishing a navigational grid therethrough within the electromagnetic radiation field throughout the underwater region; transporting said receiver means through the underwater region under control of said navigational grid; and signal processing data output from the receiver means during said transporting thereof by continuous measurement of amplitude differences between different frequency components of the data output for identification and location of the objects to be detected within the underwater region.

* * * * *